June 16, 1964  H. H. HARADA  3,137,444

ODOMETER

Filed Aug. 30, 1961

INVENTOR.
Henry H. Harada
BY
George E. Johnson
ATTORNEY

United States Patent Office 3,137,444
Patented June 16, 1964

3,137,444
ODOMETER
Henry H. Harada, Grand Blanc, Mich., assignor to General Motors Corporation, Detroit, Mich., a corporation of Delaware
Filed Aug. 30, 1961, Ser. No. 134,914
1 Claim. (Cl. 235—117)

This invention relates to odometers and particularly to wheel-type odometers useful in automobiles.

Odometers, as heretofore constructed, have each often been characterized by having wheels driven by interposed pinions supported in or on carrier plates, the wheels and plates being stacked on a supporting shaft with clearance for turning of the wheels being provided for the entire stack but not predetermined separately for each wheel. It has now been found that allotment of a definite or fixed clearance to each wheel and an improved alignment of parts resulting in the prevention of cocking may be realized in a simple odometer structure capable of operating smoothly and with a minimum of friction.

An object of the present invention is to provide an improved odometer of simple construction in which operative parts are firmly held in proper alignment for operating with smoothness and a minimum of friction.

A feature of the invention is an odometer having wheels each mounted for rotation on its own bushing or bearing portion and which is separated from an adjacent wheel by a fixed pinion carrier abutting or firmly held to the bearing portion. Another feature is an odometer having fixed structure supporting a series of coaxial and numbered wheels, the structure being such as to maintain a predetermined clearance for each wheel. Another feature is an odometer arrangement having multiple pinion gears for transferring motion from wheel to wheel with each pinion gear grooved to fit a notched portion of a fixed pinion carrier plate separating adjacent wheels.

These and other important features of the invention will now be described in detail in the specification and then pointed out more particularly in the appended claim.

An odometer over which the presently described device may be considered to be an improvement is disclosed in the United States Patent Number 2,117,024, granted May 10, 1938, in the names of R. O. Helgeby and H. H. Harada.

Figure 1:
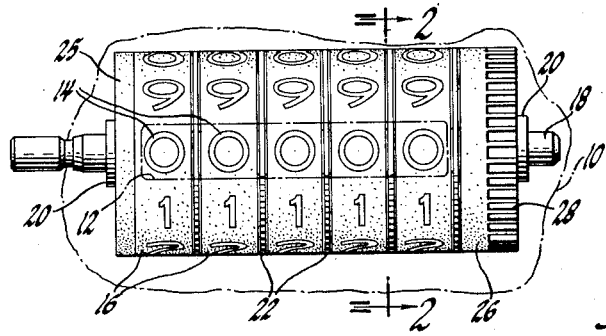
FIGURE 1 is a phantom view of a portion of an odometer casing with a stack of wheels located therein and forming one embodiment of the present invention.
Figure 2:
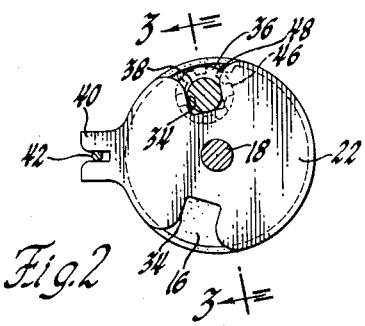
FIGURE 2 is a sectional view looking in the direction of the arrows 2—2 in FIGURE 1.

In FIGURE 1 of the drawings a portion 10 of an odometer casing is shown as being apertured at 12 for the viewing of five numerals 14 on five coaxial and number wheels 16. These wheels are mounted for rotation on a shaft 18 fixed within the casing 10. Details regarding the shaft are immaterial insofar as the present invention is concerned but it suffices to say that the shaft is provided with two brass washers 20 fixed to remote portions of the shaft and between which are placed and clamped five spaced carrier pinion plates 22, six bushings 24, and a disk 25.

Figure 5:
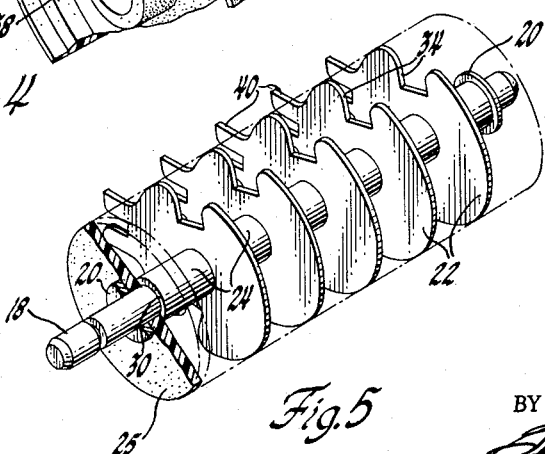
FIGURE 5 is a perspective view of the non-rotative or fixed parts for retaining the wheels of the stack in their operative positions, the rotative wheels being omitted in order more clearly to show the structure.

FIGURE 5 shows the arrangement of fixed or non-rotative parts with the rotatable numbered wheels 16 and a driver or dummy wheel 26 removed. The fixed assembly of FIGURE 5 comprises the shaft 18 with its two washers 20 between them confining or clamping the bushings 24, the disk 25 and the carrier plates 22, the bushings and plates alternating in position.

Next to one of the brass washers 20 is located the dummy wheel 26 having teeth 28 about its periphery by means of which it may be driven. This dummy wheel 26 may be driven by gearing deriving its power from a conventional speedometer shaft. It will be understood that the dummy wheel 26 is rotatively mounted on a bushing 24 as is each of the numbered wheels 16 but with a clearance maintained between one plate 22 and corresponding washer 20. At the other end of the odometer wheel assembly is located the plain disk 25 of the same diameter characterizing the wheels 16 and 26. This plain disk 25 is non-rotatively held and with no clearance between the corresponding brass washer 20 and an end 30 (FIGURE 5) of an end bushing 24.

Each pinion gear carrier plate 22 is provided with two notches 34, only one of which is needed. Two notches are used, however, to facilitate assembly. A pinion gear 36 is provided between adjacent wheels so that when the dummy wheel 26 is given ten turns in one direction the first number wheel 16 adjacent to the dummy wheel will be given one revolution. Each wheel 16 has teeth on one side and along its full inner periphery as at 44 for continued meshing with teeth 46 on a corresponding pinion gear 36. That same wheel has two inner teeth 48 in its other side for intermittently engaging one of three teeth 50 on an adjacent pinion 36 for driving the next wheel 16. The five gears 36 necessary to drive the five numbers wheel 16 are die cast with opposed recesses such as the recess 51 facilitating manufacture. Each pinion gear 36 is provided with an annular groove 38 for receiving the thin metal of the corresponding carrier plate 22 firmly to hold the pinion gear on a axis of rotation substantially parallel with the axis of the shaft 18. With this arrangement there is no danger of a gear 36 assuming a cocked position and thereby unlocking or unduly retarding operation of the odometer. The non-rotative position of each carrier plate 22 is assured, not only by its clamped relation with the bushings 24 and the remaining plates 22 between the washers 20, but also by a notched tongue 40 in engagement with a fixed bar 42. This bar is used in a way similar to an equivalent bar disclosed in United States Patent 2,243,738, granted May 27, 1941, in the name of I. E. Mather.

Figure 3:
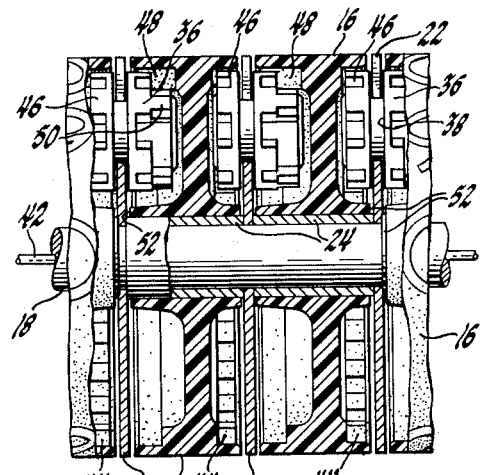
FIGURE 3 is an enlarged sectional view looking in the direction of the arrows 3—3 in FIGURE 2.
Figure 4:
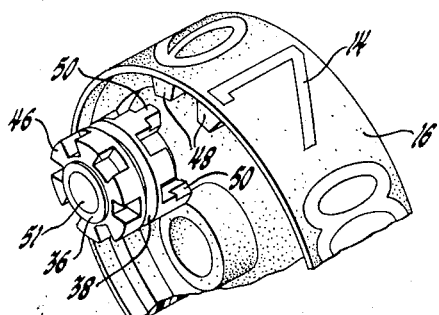
FIGURE 4 is a perspective view of a portion of a numbered wheel and a pinion gear adapted to be driven thereby.

In FIGURE 3, it may be seen that each bushing 24 is of such a length as to exceed slightly the width of each of the corresponding wheels 16 or 26. This assures a definite and predetermined clearance 52 for each wheel as measured in the direction of the axis of the shaft 18. Because of this construction the bushings 24 serve to distribute the available end play necessary for the wheels rather than merely providing a total end play or clearance for all the wheels and the wheels are uniformly free to turn. Also, the positively held angular relationship of the plates 22 and pinion gears 36 results in correct alignment of the numerals 14 to be read through the window 12.

I claim:

In an odometer, structure comprising a series of alternating plates and numbered wheels arranged in stacked relation on a shaft, each of said wheels being rotatable on a bushing clamped on said shaft between adjacent plates, a notch extending inwardly from the periphery of each of said plates, a pinion gear for each of said plates, each of said gears having an annular groove intermediate its length and means for transmitting motion between adjacent wheels, and marginal portions of each of said plates defining one of said notches being retained within the groove of the corresponding pinion gear whereby said numbered wheels and pinion gears are held in alignment.

References Cited in the file of this patent

UNITED STATES PATENTS

| | | |
|---|---|---|
| 1,128,679 | Gooch | Feb. 16, 1915 |
| 1,692,489 | Dinsmore | Nov. 20, 1928 |
| 1,797,738 | Tittensor | Mar. 24, 1931 |
| 2,656,107 | Vogler | Oct. 20, 1953 |
| 2,753,116 | Manke | July 3, 1956 |

FOREIGN PATENTS

| | | |
|---|---|---|
| 223,894 | Great Britain | June 11, 1925 |